(12) United States Patent
Bishop

(10) Patent No.: US 11,052,990 B2
(45) Date of Patent: Jul. 6, 2021

(54) INTERFACE BETWEEN AN OUTER END OF A WING AND A MOVEABLE WING TIP DEVICE

(71) Applicant: Airbus Operations Limited, Bristol (BB)

(72) Inventor: Benjamin Bishop, Bristol (GB)

(73) Assignee: Airbus Operations Limited, Bristol (GB)

( * ) Notice: Subject to any disclaimer, the term of this patent is extended or adjusted under 35 U.S.C. 154(b) by 306 days.

(21) Appl. No.: 16/199,721

(22) Filed: Nov. 26, 2018

(65) Prior Publication Data
US 2019/0161161 A1 May 30, 2019

(30) Foreign Application Priority Data
Nov. 27, 2017 (GB) .................................... 1719641

(51) Int. Cl.
*B64C 3/56* (2006.01)
*B64C 3/38* (2006.01)
*B64C 3/40* (2006.01)

(52) U.S. Cl.
CPC .............. *B64C 3/56* (2013.01); *B64C 3/38* (2013.01); *B64C 3/40* (2013.01)

(58) Field of Classification Search
CPC .... B64C 3/38; B64C 3/40; B64C 3/56; B64C 23/072; B64C 23/065; B64C 5/08; B64C 5/10; Y02T 50/10
See application file for complete search history.

(56) References Cited

U.S. PATENT DOCUMENTS 1,723,962 A * 8/1929 Weymouth ................ B64C 3/56
244/49
1,928,336 A * 9/1933 Kindelberger ............ B64C 3/56
244/49
(Continued)

FOREIGN PATENT DOCUMENTS

EP 2669187 12/2013
EP 3069987 9/2016
(Continued)

OTHER PUBLICATIONS

European Search Report for European Application No. EP 18203336.5, 10 pages, dated Mar. 19, 2019.
(Continued)

*Primary Examiner* — Medhat Badawi
(74) *Attorney, Agent, or Firm* — Nixon & Vanderhye P.C.

(57) ABSTRACT

An aircraft (1002) including a wing (1001), having a fixed wing (1005) with a wing tip device (1003) moveably mounted at the outer end thereof. The wing tip device (1003) is moveable between: a flight configuration; and a ground configuration. The wing tip device (1003) and the fixed wing (1005) are separated along an oblique primary cut plane (1013). The wing tip device (1003) and the fixed wing (1005) meet along an interfacing cut line (1035). The interfacing cut line (1035) includes a first length (1037) offset from the primary cut plane (1013) in a first direction; a second length (1041) that extends within a plane (P) containing the axis of rotation (1011), or a plane parallel thereto; and a transition section (1039) over which the interfacing cut line (1035) transitions from the first length to the second length. The second length may extend around the upper surface, around the leading edge and onto the lower surface.

18 Claims, 12 Drawing Sheets

(56) References Cited

U.S. PATENT DOCUMENTS

| | | | | |
|---|---|---|---|---|
| 2,021,324 A * | 11/1935 | Osborn | B64C 3/56 | 244/49 |
| 2,166,564 A * | 7/1939 | Pavlecka | B64C 3/56 | 244/49 |
| 2,290,850 A * | 7/1942 | Umschweif | B64C 3/56 | 244/49 |
| 2,375,423 A * | 5/1945 | Lobelle | B64C 3/54 | 244/218 |
| 2,418,301 A * | 4/1947 | Heal | B64C 3/42 | 244/91 |
| 2,674,422 A * | 4/1954 | Pellarini | B64C 3/56 | 244/49 |
| 2,712,421 A * | 7/1955 | Naumann | B64C 3/56 | 244/49 |
| 2,961,196 A * | 11/1960 | Atkinson | B64C 3/40 | 244/46 |
| 3,039,721 A * | 6/1962 | Rogers, Jr. | B64D 37/04 | 244/135 R |
| 3,081,053 A * | 3/1963 | Jarrell | B64C 3/56 | 244/49 |
| 3,439,890 A * | 4/1969 | Stits | B64C 3/56 | 244/49 |
| 3,599,904 A * | 8/1971 | Condit | B64C 3/38 | 244/38 |
| 3,647,163 A * | 3/1972 | Swwwney | B64C 3/56 | 244/49 |
| 3,743,218 A * | 7/1973 | Sweeney | B64C 3/42 | 244/36 |
| 4,022,403 A * | 5/1977 | Chiquet | B61B 15/00 | 244/46 |
| 4,132,375 A * | 1/1979 | Lamar | B64C 23/072 | 244/90 R |
| 4,336,914 A * | 6/1982 | Thomson | F42B 10/20 | 244/3.27 |
| 4,667,898 A * | 5/1987 | Greenhalgh | B64C 31/028 | 244/219 |
| 4,691,880 A * | 9/1987 | Frank | F42B 10/16 | 244/49 |
| 4,717,093 A * | 1/1988 | Rosenberger | F42B 10/16 | 244/49 |
| 4,778,129 A * | 10/1988 | Byford | B64C 3/56 | 244/49 |
| 4,779,820 A * | 10/1988 | Lambert | B64C 3/56 | 244/49 |
| 5,192,037 A * | 3/1993 | Moorefield | B64C 3/56 | 244/3.28 |
| 5,201,479 A * | 4/1993 | Renzelmann | B64C 3/56 | 244/49 |
| 5,310,138 A * | 5/1994 | Fitzgibbon | B64C 3/56 | 244/49 |
| 5,350,135 A * | 9/1994 | Renzelmann | B64C 3/56 | 244/49 |
| 5,372,336 A * | 12/1994 | Paez | B64C 3/56 | 244/49 |
| 5,427,329 A * | 6/1995 | Renzelmann | B64C 3/56 | 244/49 |
| 5,558,299 A * | 9/1996 | Veile | B64C 3/56 | 244/49 |
| 5,671,899 A * | 9/1997 | Nicholas | B64C 3/40 | 244/3.28 |
| 6,076,766 A * | 6/2000 | Gruensfelder | B64C 3/56 | 244/130 |
| 6,260,798 B1 * | 7/2001 | Casiez | B64C 39/024 | 244/49 |
| 6,260,799 B1 * | 7/2001 | Russ | B64C 3/56 | 244/49 |
| 6,361,279 B1 * | 3/2002 | Rodde | B64C 27/467 | 416/223 R |
| 6,446,906 B1 * | 9/2002 | Voigt | B64C 9/36 | 244/3.27 |
| 6,497,600 B1 * | 12/2002 | Levy | B64C 17/00 | 446/34 |
| 6,834,835 B1 * | 12/2004 | Knowles | B64C 3/54 | 244/198 |
| 7,582,977 B1 * | 9/2009 | Dehlsen | F03B 17/061 | 290/1 R |
| 7,637,454 B2 * | 12/2009 | Pitt | B64C 3/52 | 244/123.8 |
| 7,811,151 B2 * | 10/2010 | Conrad | A63H 27/02 | 446/62 |
| 8,089,034 B2 * | 1/2012 | Hammerquist | B64C 3/56 | 244/3.28 |
| 8,342,447 B2 * | 1/2013 | Etling | B64C 9/00 | 244/90 R |
| 8,419,362 B2 * | 4/2013 | Bertolotti | F03D 7/0236 | 416/1 |
| 8,584,984 B2 * | 11/2013 | Parks | B64C 3/56 | 244/49 |
| 8,651,431 B1 * | 2/2014 | White | B64C 23/076 | 244/218 |
| 10,214,278 B2 * | 2/2019 | Briancourt | B64C 23/072 | |
| 10,392,101 B2 * | 8/2019 | Axford | B64C 3/56 | |
| 10,583,909 B2 * | 3/2020 | Alexander | B64C 3/40 | |
| 10,676,173 B2 * | 6/2020 | Thompson | B64C 3/56 | |
| 2002/0066825 A1 * | 6/2002 | Miralles | B64C 39/024 | 244/49 |
| 2003/0080243 A1 * | 5/2003 | Hoisington | B64C 3/56 | 244/13 |
| 2004/0159227 A1 * | 8/2004 | Richards | B64C 3/56 | 89/1.4 |
| 2005/0218260 A1 * | 10/2005 | Corder | B64C 3/56 | 244/49 |
| 2008/0191099 A1 | 8/2008 | Werthmann et al. | | |
| 2010/0170995 A1 * | 7/2010 | Maenz | B64C 1/26 | 244/131 |
| 2012/0280080 A1 * | 11/2012 | Lubenow | B64C 39/024 | 244/49 |
| 2012/0292436 A1 * | 11/2012 | Karem | B64C 3/56 | 244/49 |
| 2013/0313356 A1 | 11/2013 | Santini et al. | | |
| 2013/0341467 A1 * | 12/2013 | Sakurai | B64C 3/56 | 244/201 |
| 2015/0097087 A1 | 4/2015 | Sakurai et al. | | |
| 2015/0336657 A1 * | 11/2015 | Townsend | B64C 3/56 | 244/49 |
| 2016/0244145 A1 * | 8/2016 | Thompson | B64C 23/072 | |
| 2016/0244153 A1 * | 8/2016 | McMahon | B64C 3/38 | |
| 2016/0332721 A1 * | 11/2016 | Hancock | B64C 3/56 | |
| 2016/0332723 A1 * | 11/2016 | Korya | B64C 3/56 | |
| 2017/0029089 A1 * | 2/2017 | Alexander | B64C 3/40 | |
| 2017/0137110 A1 * | 5/2017 | Harding | B64C 13/28 | |
| 2017/0137111 A1 * | 5/2017 | Harding | B64C 3/56 | |
| 2017/0152016 A1 * | 6/2017 | Napier | B64C 3/185 | |
| 2017/0190410 A1 * | 7/2017 | Good | B64C 3/56 | |
| 2017/0321804 A1 * | 11/2017 | Soman | B64C 3/56 | |
| 2017/0334543 A1 * | 11/2017 | Wildman | B64C 23/072 | |
| 2017/0355436 A1 * | 12/2017 | Thompson | B64C 3/56 | |
| 2017/0355437 A1 * | 12/2017 | Bishop | B64C 23/072 | |
| 2017/0355438 A1 * | 12/2017 | Bishop | B64C 3/56 | |
| 2017/0355440 A1 * | 12/2017 | Bishop | B64C 3/56 | |
| 2017/0369151 A1 * | 12/2017 | Thompson | B64C 3/56 | |
| 2018/0170519 A1 * | 6/2018 | Brakes | F16F 7/08 | |
| 2019/0161162 A1 * | 5/2019 | Bishop | B64C 3/56 | |

FOREIGN PATENT DOCUMENTS

| | | |
|---|---|---|
| GB | 627121 | 7/1949 |
| GB | 2551185 | 12/2017 |
| WO | 2015/150835 | 10/2015 |
| WO | 2016/203201 | 12/2016 |

OTHER PUBLICATIONS

Combined Search and Examination Report for GB1719641.1, dated May 16, 2018, 6 pages.

* cited by examiner

View along axis 1011

View along axis 1011

INTERFACE BETWEEN AN OUTER END OF A WING AND A MOVEABLE WING TIP DEVICE

RELATED APPLICATION

This application claims priority United Kingdom (GB) 1719641.1 filed Nov. 27, 2017, which is incorporated in its entirety by reference.

BACKGROUND OF THE INVENTION

There is a trend towards increasingly large passenger aircraft, for which it is desirable to have correspondingly large wing spans. However, the maximum aircraft span is effectively limited by airport operating rules which govern various clearances required when maneuvering around the airport (such as the span and/or ground clearance required for gate entry and safe taxiway usage).

To address this problem, various arrangements comprising moveable wing tip devices, that specifically enable the span to be reduced in a ground configuration, have been suggested.

WO2015/150835 is an example of a suggested arrangement. In the arrangement of WO2015/150835 the wing tip device and the fixed wing are separated along an oblique cut plane and the wing tip device is rotatable about an axis of rotation perpendicular to that cut plane.

In the arrangement of WO2015/150835, sealing the interface between the fixed wing and the wing tip device (when the wing tip device is in the flight configuration) has been found to be problematic. More specifically, as the wing tip device rotates between the flight and the ground configurations, relative sliding motion occurs at the interface between the outer end of the fixed wing and the inner end of the wing tip device. Whilst a sliding seal may, in principle, be employed, such a solution is sub-optimal because sliding seals tend to be subjected to relatively large amounts of wear. This may make them susceptible to wear and/or damage and may therefore necessitate frequent inspection and/or replacement of the seal.

UK patent application GB1610108.1 in the name of Airbus Operations Limited (filed on 9 Jun. 2016, and currently unpublished) suggests an arrangement in which the outer end of the fixed wing and the inner end of the wing tip device meet along an interfacing cut line that separates the outer surfaces of the fixed wing and the wing tip device. The contents of GB1610108.1 are incorporated herein by reference. In an embodiment described in GB1610108.1, the interfacing cut line comprises: a first length, formed by a cut through the outer surface, but offset from the primary cut plane in a first direction; a second length, formed by a cut through the outer surface but offset from the primary cut plane in a second direction, opposite to the first direction; and a transition section over which the interfacing cut line transitions from the first length to the second length. The wing tip device may contact the fixed wing at a sliding contact along the transition section, but the wing tip device separates away from the fixed wing along the first length and second lengths. In embodiments suggested in UK patent application GB1610108.1, the first length may be in a first plane that is parallel to the primary cut plane but offset from the primary cut plane in the first direction, and the second length may be in a second plane that is parallel to the primary cut plane but offset from the primary cut plane in the second direction.

Aspects of the present invention seek to provide yet further improvements to the interface between the fixed wing and the wing tip device.

SUMMARY OF THE INVENTION

According to a first aspect of the invention, there is provided an aircraft comprising a wing, the wing having a fixed wing with a wing tip device moveably mounted at the outer end thereof, the wing tip device being moveable between: (a) a flight configuration for use during flight; and (b) a ground configuration for use during ground-based operations, in which ground configuration the wing tip device is moved away from the flight configuration such that the span of the aircraft wing is reduced. In preferred embodiments, the wing tip device and the fixed wing are separated along a primary cut plane, the primary cut plane preferably being obliquely orientated, and the wing tip device being rotatable between the flight and ground configurations, about an axis of rotation orientated normal to the primary cut plane. When the wing tip device is in the flight configuration, the outer end of the fixed wing and the inner end of the wing tip device meet along an interfacing cut line that separates the outer surfaces of the fixed wing and the wing tip device. The interfacing cut line comprises, (i) a first length, preferably formed by a cut through the outer surface, that is offset from the primary cut plane in a first direction; (ii) a second length, formed by a cut through the outer surface that extends substantially within a plane containing the axis of rotation, or within a plane parallel thereto; and (iii) a transition section over which the interfacing cut line transitions from the first length to the second length.

Separating the interfacing cut line into the first and second lengths has been found to be beneficial. Since the first length is offset from the primary cut plane, when the wing tip device rotates about its axis of rotation there tends to be limited, or no, sliding contact movement along this length. Instead, the fixed wing and the wing tip device tend to separate along the first length under a local translational movement. This is beneficial because it may enable a non-sliding seal (for example a compression seal) to be employed along this length. In addition, providing a second length that is formed by a cut through the outer surface that lies substantially within a plane containing the axis of rotation, or within a plane parallel thereto, has been found to be especially beneficial. It has been recognised that by forming the second length in this manner, the orientation of the second length of the interfacing cut line tends to mean the fixed wing and the wing tip device separate (along the second length) in a locally perpendicular direction. Thus the sealing movement tends to be a pure compression. The second length, is preferably formed by a cut through the outer surface that extends within the plane containing the axis of rotation, or within a plane parallel thereto, such that the fixed wing and the wing tip device separate (along the second length) in a locally perpendicular direction as the wing tip device moves from the flight configuration towards the ground configuration.

The second length is preferably formed by a cut through the outer surface that lies substantially within a plane containing the axis of rotation. Providing a cut in this orientation, may enable the fixed wing and wing tip device to separate simultaneously along the full length of the second cut line, as the wing tip device moves from the flight configuration towards the ground configuration (and vice versa that the fixed wing and wing tip device meet simultaneously along the full length of the second cut line as the wing tip device moves into the flight configuration). The second length is preferably formed by a cut through the outer surface that extends within the plane containing the axis of rotation, such that the fixed wing and wing tip device to separate simultaneously along the full length of the second cut line, as the wing tip device moves from the flight configuration towards the ground configuration.

When the wing tip device rotates from the flight configuration to the ground configuration, the wing tip device may separate away from the fixed wing along the first length and second length. The separation is preferably a translational movement of the opposing parts of the fixed wing and the wing tip device, away from each other. It will be appreciated that the wing tip device rotates about the axis of rotation, so the separation/translational movement referred to is a local movement in the vicinity of the interface—when considering the wing tip device as a whole, it rotates relative to the fixed wing. There is preferably no sliding contact along the second length. There is preferably no sliding contact along the first length.

The wing tip device is rotatable between the flight and ground configurations, about an axis of rotation. The orientation of the axis is preferably such that when the wing tip device is rotated about the axis, from the flight configuration to the ground configuration, the span of the aircraft wing is reduced.

The axis of rotation is orientated normal to a primary cut plane. The primary cut plane is preferably oblique. The cut plane preferably extends through the upper and lower surfaces of the wing. The distance, along the upper surface of the wing, from the root of the wing to the cut plane (i.e. to where the cut plane intersects the upper surface) may be less than the distance, along the lower surface of the wing, from the root of the wing to the cut plane (i.e. to where the cut plane intersects the lower surface). Thus, the cut plane may create an overcut with respect to the fixed wing. In other embodiments, the distance, along the upper surface of the wing, from the root of the wing to the cut plane (i.e. to where the cut plane intersects the upper surface) may be more than the distance, along the lower surface of the wing, from the root of the wing to the cut plane (i.e. to where the cut plane intersects the lower surface). Thus, the cut plane may create an undercut with respect to the fixed wing.

The primary cut plane is preferably a notional plane separating the fixed wing and the wing tip device (for example a cut plane created during the design phase of the wing). It will be appreciated that the cut plane need not necessarily manifest itself as a physical, planar, surface throughout the depth of the wing. The primary cut plane will be readily identifiable to the skilled person. The primary cut plane may be plane within which the wing tip device rotates. Some embodiments of the invention may comprise a bearing, such as a slew ring, for supporting rotation of the wing tip device. The bearing may be co-axial with the rotational axis. The primary cut plane may extend through the thickness of the bearing, and typically through the mid-thickness of the bearing (i.e. the mid-thickness of the bearing is co-planar with the primary cut plane).

The axis of rotation may be orientated at an angle to (i.e. not including being parallel or perpendicular to) a longitudinal direction. The axis is preferably at an angle to (i.e. not including being parallel or perpendicular to) a lateral direction. The axis is preferably at an angle to (i.e. not including being parallel or perpendicular to) a vertical direction. The vertical, longitudinal and lateral directions may be mutually perpendicular. In some embodiments, the longitudinal, lateral and vertical directions may be in an absolute frame of reference (i.e. longitudinal is fore-aft, lateral is port-starboard and vertical is vertical from the ground). The longitudinal direction may be a chordwise direction; the lateral direction may be a spanwise direction. In other embodiments, it may be appropriate to use the longitudinal, lateral and vertical directions in a frame of reference local to the wing. For example, for a swept wing the longitudinal direction may instead be along the length of the wing, and the lateral direction may be along the width of the wing (i.e. from the leading to the trailing edges, measured perpendicular to the longitudinal direction). Alternatively or additionally, for a wing with dihedral, the vertical direction may be perpendicular to the plane of the wing. In all cases, the cut plane/axis is orientated such that the span of the wing is reduced when the wing tip device is rotated about the axis.

The wing tip device is preferably rotatable about a single axis of rotation. For example, the rotation of the wing tip device is preferably not the result of a compound rotation (i.e. a net rotation created by a plurality of separate rotations about separate axes).

The axis is preferably at an angle of less than 45 degrees, and more preferably less than 25 degrees, from the vertical. The axis may be at an angle of 15 degrees from the vertical axis. The present invention has been found to be especially beneficial in embodiments in which the axis is at a relatively small angle from the vertical because the orientation of axis results in a shallow cut plane and the area of the interface between the fixed wing and wing tip device may therefore be relatively large.

Embodiments of the present invention have been found to be especially beneficial when there is a desire to create a seal between the fixed wing and the wing tip device. The wing may comprise a sealing assembly for sealing between the fixed wing and the wing tip device when the wing tip device is in the flight configuration.

The sealing assembly may comprise a compression seal for making/breaking a seal under a relative coming together/separation of the fixed wing and wing tip device. The compression seal may be associated with the first and second lengths.

The wing may comprise a seal support structure located along the second length. The second seal support structure may be orientated parallel to the plane containing the second cut line (for example along the thickness of the wing skin and co-planar with the plane within which the second length extends. This may be beneficial because it can support the seal undergoing pure compression (i.e. compression in a direction perpendicular to the plane containing the second line).

In principle, the cut forming the second length may be orientated in a number of different directions (so long as the plane it lies in (or is parallel to) also contains the axis of rotation). In some embodiments, the cut forming the second length is orientated in the line-of-flight direction. Such an arrangement tends to be preferable from the aerodynamic point of view. In some other embodiments, the fixed wing comprises a front spar and the cut forming the second length is orientated perpendicular to the front spar. Such an arrangement tends to facilitate integration of the wing tip device with a fixed wing having a leading edge slat in the region of the tip.

The first length is preferably located aft of the axis of rotation. The second length is preferably located fore of the axis of rotation.

The wing may comprise an upper surface extending from the leading edge, over the wing, to the trailing edge. The wing may comprise a lower surface extending from the leading edge, under the wing, to the trailing edge. The first length may be along the upper surface of the wing. The second length may extend along the upper surface of the wing, and may pass through the leading edge and extend onto the lower surface of the wing. Such an arrangement is especially beneficial when the first and second lengths are either side of the axis of rotation, as the lengths on the same (upper or lower) surface will tend to move in opposite directions as the wing tip device rotates. By having the second cut line extending within the specified plane, it is possible to extend the cut line from the upper surface to the lower surface at the leading edge of the wing because the fixed wing and wing tip device simply separate way from each other along this line and there is no need to transition to a different cut line on the lower surface. Such an arrangement may also enable a single seal assembly to be provided along this entire length.

The interfacing cut line may further comprise: (iii) a third length, on the lower surface of the wing that is formed by cut through the outer surface. The third length may be offset from the primary cut plane in a second direction, preferably opposite to the first direction. The interfacing cut line may also comprise (iv) a further transition section over which the interfacing cut line transitions from the third length to the part of the second length on the lower surface.

The wing tip device may separate away from the fixed wing along the third length. The separation is preferably a translational movement of the opposing parts of the fixed wing and the wing tip device, away from each other.

In embodiments in which the second length is located fore of the axis of rotation and the first length is located aft of the axis of rotation, a third length is preferably located aft of the axis of rotation.

The interfacing cut line may comprise further a transition section between the first and third lengths. The further transition section(s) are preferably such that the interfacing cut line is made up of the first to third lengths, each length transitioning into the adjacent length by a respective transition section. The further transition section between the first and third section may be in the vicinity of the trailing edge of the wing.

In principle, the first length may be in a number of different shapes. For example, as per the arrangement in GB1610108.1, the first length may be in a first plane that is parallel to the primary cut plane but offset from the primary cut plane in the first direction. In preferred embodiments, the first length is curved and the curve is shaped such that it does not lie within a single plane. In other words, the curve is preferably not formed by an intersection of a plane with the outer surface of the wing. Having the first length in such a curved shape has been found to be beneficial in terms of the resulting relative movement between the fixed wing and the wing tip device along the interface (when the wing tip device rotates about the axis). Furthermore, it may facilitate a relatively small transition section between the first length, and a third length, in the region of the trailing edge because the ends of those lengths can be brought closer together, whilst still avoiding any potential clash.

The first length is preferably offset from the primary cut plane in an inboard direction.

In the transition section, the interfacing cut line transitions from the first length to the second length. The transition section may be relatively short. The transition section may be shorter than the first and the second lengths.

In principle, the transition section may take a number of forms. In a preferred embodiment of the invention, the transition section is a curved section centred on the axis of rotation, the radius of the curved section continuously increasing as the cut line passes around the axis. Providing an interface having a curved section in which the radius of the curved section continuously increases around the axis of rotation, has been found to be especially beneficial. In particular, since the radius of the curved section of the interfacing cut line increases, and that curved section of the interfacing cut line is centred on the rotational axis of the wing tip, it means that the structure of the wing tip device separates away from the structure of the fixed wing along the interfacing cut line as the wing tip device rotates away from the flight configuration.

The radius of the curved section preferably increases as the cut line passes around the axis in the direction of rotation that moves the wing tip device from the flight configuration to the ground configuration. Correspondingly, the radius of the curved section preferably constantly decreases as the cut line passes around the axis in the direction of rotation that moves the wing tip device from the ground configuration to the flight configuration.

The above-mentioned directions are to be considered from a view along the axis of rotation, towards the surface of the wing on which the interfacing cut line lies. For example, in embodiments on which the curved section of the interfacing cut line is located on the upper surface of the wing, the directions are considered from a view along the axis of rotation onto that upper surface. In general, unless otherwise specified, it will be appreciated that references to the shape, radius or other features of the interfacing cut line are to be taken when viewing the cut line in this direction along the axis of rotation, and onto the surface of the wing on which the relevant part of the interfacing cut line lies. In other words the features of the curved section may be considered with reference to a projection of the curved section onto a plane that is perpendicular to the axis of rotation.

In embodiments comprising a plurality of transition sections, it will be appreciated that any features herein described with reference to one transition section may apply equally to any or all of the other transition sections.

In embodiments of the present invention, the wing tip device is configurable between: (a) a flight configuration for use during flight and (b) a ground configuration for use during ground-based operations, in which ground configuration the wing tip device is moved away from the flight configuration such that the span of the aircraft wing is reduced. In the flight configuration, the span may exceed an airport compatibility limit. In the ground configuration the span may be reduced such that the span (with the wing tip device in the ground configuration) is less than, or substantially equal to, the airport compatibility limit. The airport compatibility limit is a span limit (for example relating to clearance restrictions for buildings, signs, other aircraft). The compatibility limit is preferably a gate limit.

The wing tip device may be a wing tip extension; for example the wing tip device may be a planar tip extension. In other embodiments, the wing tip device may comprise, or consist of, a non-planar device, such as a winglet.

In the flight configuration the trailing edge of the wing tip device is preferably a continuation of the trailing edge of the fixed wing. The leading edge of the wing tip device is preferably a continuation of the leading edge of the fixed wing. There is preferably a smooth transition from the fixed wing to the wing tip device. It will be appreciated that there may be a smooth transition, even where there are changes in sweep or twist at the junction between the fixed wing and wing tip device. However, there are preferably no discontinuities at the junction between the fixed wing and wing tip device. The upper and the lower surfaces of the wing tip device may be continuations of the upper and lower surfaces of the fixed wing. The span ratio of the fixed wing relative to the wing tip device may be such that the fixed wing comprises 70%, 80%, 90%, or more, of the overall span of the aircraft wing.

When the wing tip device is in the ground configuration, the aircraft incorporating the wing, may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

According to another aspect of the invention, there is provided an aircraft wing for use as the wing in the aircraft of another aspect of the invention. The wing may have a fixed wing with a wing tip device moveably mounted at the outer end thereof, the wing tip device being moveable between: (a) a flight configuration for use during flight; and (b) a ground configuration for use during ground-based operations, in which ground configuration the wing tip device is moved away from the flight configuration such that the span of the aircraft wing is reduce. The wing tip device and the fixed wing may be separated along a primary cut plane, the primary cut plane being obliquely orientated, and the wing tip device being rotatable between the flight and ground configurations, about an axis of rotation orientated normal to the primary cut plane. When the wing tip device is in the flight configuration, the outer end of the fixed wing and the inner end of the wing tip device meet along an interfacing cut line that separates the outer surfaces of the fixed wing and the wing tip device. The interfacing cut line comprises: (i) a first length, formed by a cut through the outer surface, that is offset from the primary cut plane in a first direction; (ii) a second length, formed by a cut through the outer surface, that extends within a plane containing the axis of rotation, or within a plane parallel thereto; and (iii) a transition section in which the interfacing cut line transitions from the first length to the second length.

According to another aspect of the invention, there is provided a fixed wing, for use as the fixed wing in other aspects of the invention described herein. The fixed wing may be configured to receive a wing tip device that is separated along a primary cut plane, the primary cut plane being obliquely orientated, such that the wing tip device may be rotatable between the flight and ground configurations, about an axis of rotation orientated normal to the primary cut plane. The outer end of the fixed wing is shaped such that it would meet the inner end of the wing tip device meet along an interfacing cut line that separates the outer surfaces of the fixed wing and the wing tip device. The interfacing cut line comprises: (i) a first length, formed by a cut through the outer surface, that is offset from the primary cut plane in a first direction; (ii) a second length, formed by a cut through the outer surface that extends within a plane containing the axis of rotation, or within a plane parallel thereto; and (iii) a transition section in which the interfacing cut line transitions from the first length to the second length.

According to another aspect of the invention, there is provided a wing tip device, for use as the wing tip device in other aspects of the invention described herein. The wing tip device may be configured to be received on a fixed wing that is separated along a primary cut plane, the primary cut plane being obliquely orientated, such that the wing tip device may be rotatable between the flight and ground configurations, about an axis of rotation orientated normal to the primary cut plane. The inner end of the wing tip device is shaped such that it would meet the outer end of the fixed wing along an interfacing cut line that separates the outer surfaces of the fixed wing and the wing tip device, the interfacing cut line comprising: (i) a first length, formed by a cut through the outer surface, that is offset from the primary cut plane in a first direction; (ii) a second length, formed by a cut through the outer surface that extends within a plane containing the axis of rotation, or within a plane parallel thereto; and (iii) a transition section in which the interfacing cut line transitions from the first length to the second length.

According to another aspect of the invention, there is provided a method of designing an interface between the outer end of a fixed wing and the inner end of a wing tip device for an aircraft, the wing tip device being moveable between: (i) a flight configuration for use during flight; and (ii) a ground configuration for use during ground-based operations, in which ground configuration the wing tip device is moved away from the flight configuration such that the span of the aircraft wing is reduced, wherein the method comprises the steps of: separating the wing tip device and the fixed wing along a primary cut plane, the primary cut plane being obliquely orientated, and the wing tip device being rotatable between the flight and ground configurations, about an axis of rotation orientated normal to the primary cut plane, defining an interfacing cut line that separates the outer surfaces of the fixed wing and the wing tip device, by defining (i) a first length, formed by cut through the outer surface that is offset from the primary cut plane in a first direction; (ii) a second length, formed by a cut through the outer surface that extends within a plane containing the axis of rotation, or within a plane parallel thereto; and (iii) a transition section in which the interfacing cut line transitions from the first length to the second length. The method may comprise a step in which the wing tip device is then manufactured to that design.

According to yet another aspect of the invention, there is provided an aircraft comprising a wing, the wing having a fixed wing with a wing tip device moveably mounted at the outer end thereof, the wing tip device being moveable between: (a) a flight configuration for use during flight; and (b) a ground configuration for use during ground-based operations, in which ground configuration the wing tip device is moved away from the flight configuration such that the span of the aircraft wing is reduced. The wing tip device is rotatable between the flight and ground configurations, about an inclined axis of rotation, such that the wing tip device rotates upwards and rearwards when moving from the flight to ground configurations. When the wing tip device is in the flight configuration, the outer end of the fixed wing and the inner end of the wing tip device meet along an interfacing cut line that separates the outer surfaces of the fixed wing and the wing tip device. The interfacing cut line comprises a leading edge section passing over the upper surface, through the leading edge and onto the lower surface, the leading edge section of the cut line being formed by a cut that extends within a plane containing the axis of rotation, and the interfacing cut line comprises an upper surface section located on the upper surface and to the rear of the axis of rotation and being offset inboard from the plane containing the axis of rotation; and the interfacing cut line also comprises a lower surface section located on the lower surface to the rear of the axis of rotation and being offset outboard from the plane containing the axis of rotation. The ends of the leading edge section may adjoin respective curved sections which link the leading edge section with the upper and lower surface sections respectively, each curved section being centred on the axis of rotation, the radius of the curved sections constantly increasing as the cut line passes around the axis.

It will be appreciated that any features described with reference to one aspect of the invention are equally applicable to any other aspect of the invention, and vice versa. For example features described with reference to the aircraft of the first aspect may also be applicable to the wing, wing tip device and/or methods of the other aspects of the invention, and vice versa.

The term 'or' shall be interpreted as 'and/or' unless the context requires otherwise.

DESCRIPTION OF THE DRAWINGS

Embodiments of the present invention will now be described by way of example only with reference to the accompanying schematic drawings of which:

FIG. 3b is a frontal view of the aircraft incorporating the wing of FIG. 3a;

FIG. 5b is a plan view looking in a direction along the axis of rotation of the wing tip device in FIG. 5a;

FIG. 7 is a frontal view along the arrow A of FIG. 6a;

DETAILED DESCRIPTION

Figure 1A:
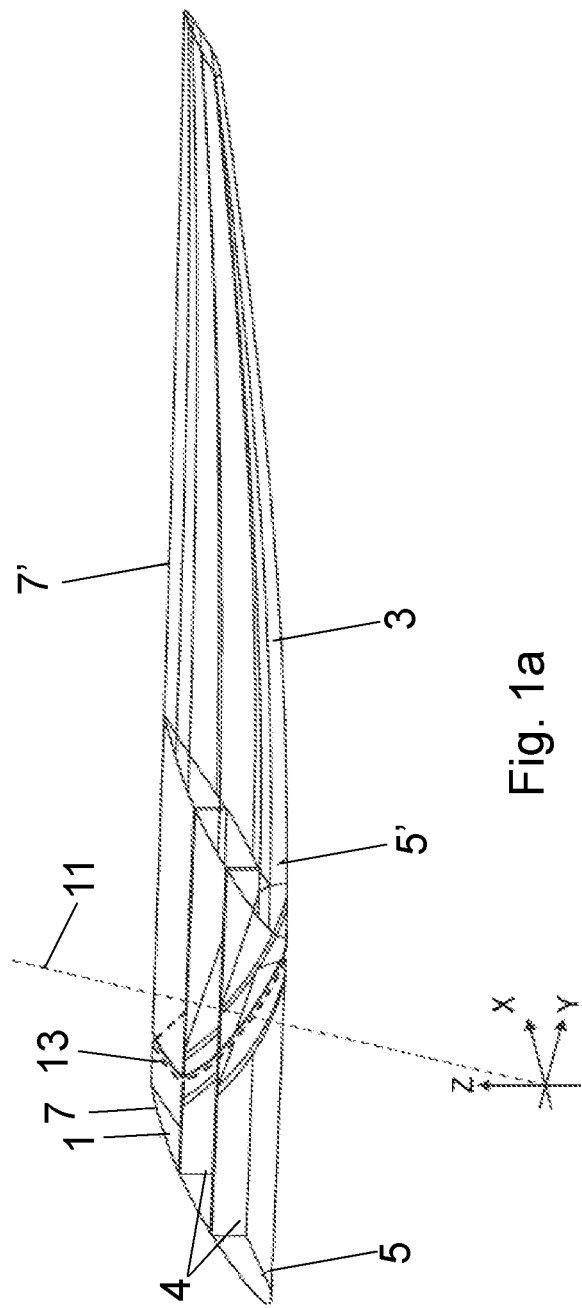
FIGS. 1a and 1b show a wing with a moveable wing tip device of the prior art.
Figure 1B:
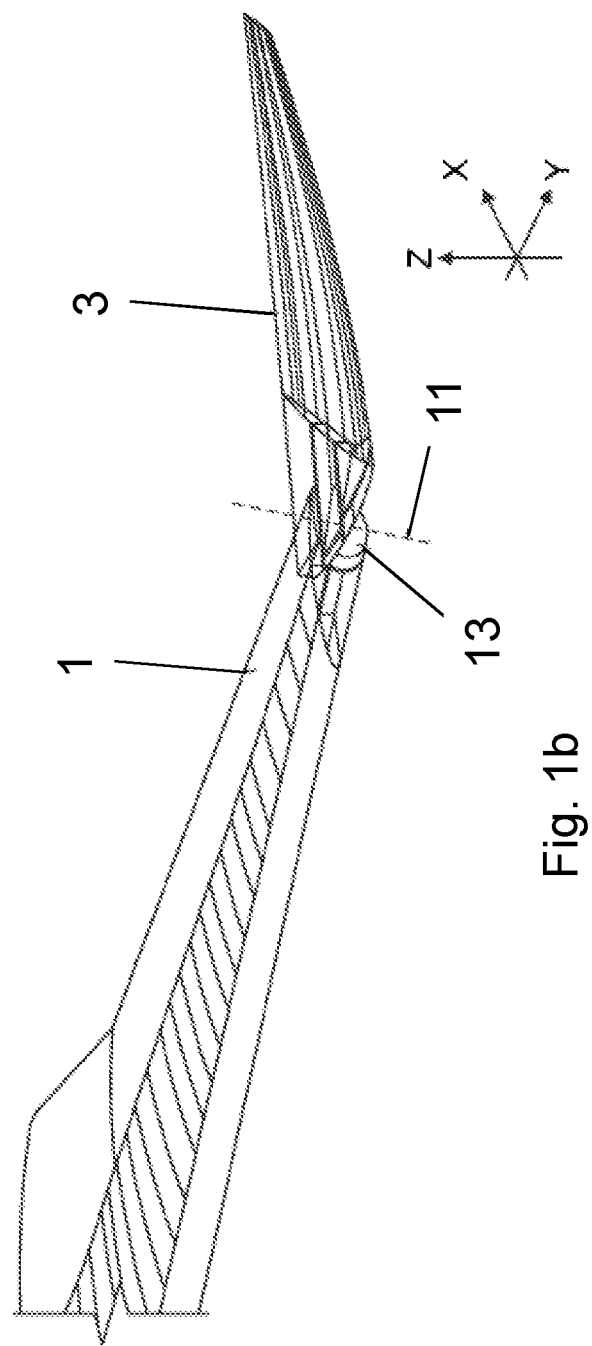

FIG. 1a is a perspective view of a fixed wing 1 and a wing tip device 3 on an aircraft shown in WO2015/150835. In summary, the wing tip device 3 is moveable between a flight configuration (FIG. 1a) and a ground configuration (FIG. 1b). In the flight configuration, the leading and trailing edges 5', 7' of the wing tip device 3 are continuations of the leading and trailing edges 5, 7 of the fixed wing 1. Furthermore, the upper and lower surfaces of the wing tip device 3 are continuations of the upper and lower surfaces of the fixed wing 1.

The wing tip device 3 is placed in the flight configuration for flight. In the flight configuration, the wing tip device 3 thus increases the span of the aircraft (thereby providing beneficial aerodynamic effects, for example, reducing the component of induced drag and increasing the lift). In principle, it would be desirable to maintain this large span at all times and simply have a large fixed wing. However, the maximum aircraft span is effectively limited by airport operating rules which govern various clearances required when maneuvering around the airport (such as the span and/or ground clearance required for gate entry and safe taxiway usage). Thus, the wing tip device 3 is moveable to a ground configuration for use when on the ground.

In the ground configuration (FIG. 1b) the wing tip device 3 is folded, from the above-mentioned flight configuration, by rotating the wing tip device 3 about a rotational axis 11. By folding the wing tip device 3 in this manner, the span of the aircraft 2 is reduced. When the wing tip device 3 is in the ground configuration, the aircraft 2 thus complies with the above-mentioned airport clearances etc.

The movement of the wing tip devices is determined by the type of joint about which the wing tip device rotates relative to the fixed wing. To achieve the above-mentioned movement, the wing tip device 3 and the fixed wing 5 are separated along an oblique cut plane 13 passing through the upper and lower surfaces of the wing. The wing tip device 3 is rotatable about the axis 11 that extends in a direction perpendicular to the oblique cut plane 13. The axis 11 is orientated at an acute angle to all three mutually perpendicular axes X, Y and Z (i.e. chordwise, spanwise and vertical).

Small gaps, steps or other mismatch at the interface between the outer end of the fixed wing and the inner end of the wing tip device, when the moveable wing tip device is in the flight configuration, can create aerodynamic penalties (e.g. drag and pressure leakage). In some moveable wing tip arrangements, such as the one described above with reference to FIGS. 1a and 1b, it has been difficult to provide an interface that eliminates these features. For example, in some arrangements, controlling the tolerances in the vicinity of the interface has been found to be difficult. It has also been found to be difficult to provide an effective sealing arrangement to inhibit leakage flow through the interface.

Figure 2:
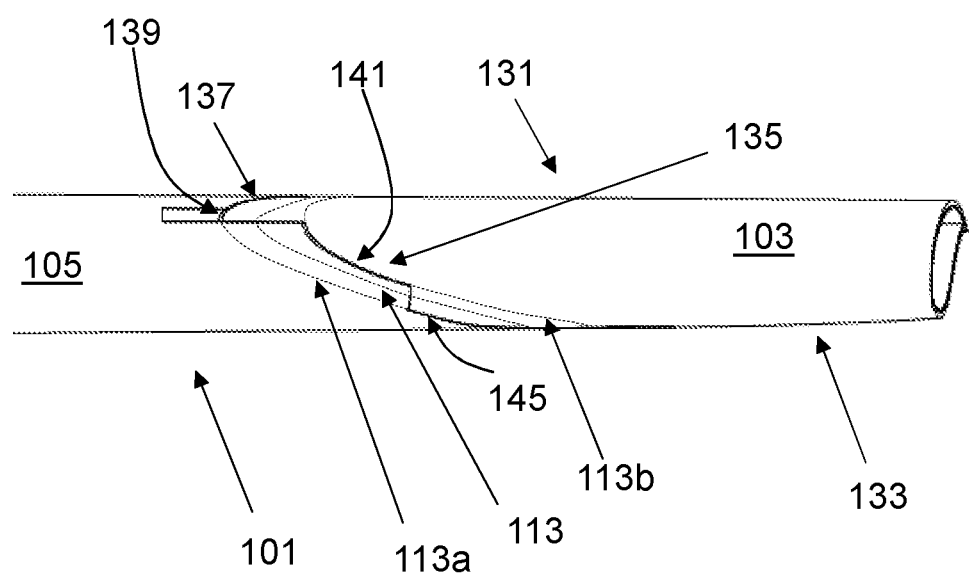
FIG. 2 is an above-frontal view of a suggested embodiment in unpublished application GB1610108.1, showing the fixed wing/wing tip device interface, the interfacing cut-lines and the cut planes.

FIG. 2 is an above-frontal view of a suggested embodiment in unpublished application GB1610108.1. FIG. 2 shows the wing 101 in the vicinity of the joint between the fixed wing 105 and wing tip device 103. The wing 101 has an upper surface 131 and a lower surface 133. The fixed wing 105 and the wing tip device 103 are separated along the notional primary cut plane 113 (to which the axis of rotation is perpendicular).

The primary cut plane 113 is indicated in FIG. 2 by the dashed-line where it intersects the wing. First and second offset, parallel, planes 113a, 113b (see below) are also indicated in FIG. 2 by the dashed-lines where those planes intersects the wing respectively. Parts of an interfacing cut line 135 extend within those planes, and this is shown by the solid lines in FIG. 2. The outer end of the fixed wing 105 and the inner end of the wing tip device 103 meet along the interfacing cut-line 135 that separates the outer surfaces of the fixed wing 105 and the wing tip device 103. The interfacing cut-line 135 is stepped, and is formed of a series of different lengths, as will now be described:

The interfacing cut line 135 comprises a first length 137 extending from the trailing edge, over the upper-aft quadrant (UA) to the start of a transition section 139. The first length 137 of interfacing cut line lies in a plane 113a that is parallel to the primary cut plane 113, but it is offset in an inboard direction.

The interfacing cut line 135 also comprises a second length 141 extending from the leading edge, over the upper-fore quadrant (UF) to the other end of the transition section 139. This second length 141 of interfacing cut line also lies in a plane 113b that is parallel to the primary cut plane 113, but it is offset in an outboard direction (i.e. in the opposite direction to the other plane 113a).

It will be appreciated from above, that the first and second lengths 137, 141 thus both lie in oblique planes parallel to the primary cut plane 113, but in planes that are offset from that primary cut plane in opposite directions.

Between the first 137 and second lengths 141 is a transition section 139. The transition section 139 comprises a first section 139a that lies in the same plane 113a as the first length 137 and a second section 139b at which the interfacing cut jumps across from the first plane 113a to the second plane 113b. The transition section 139 thus transitions the interfacing cut line 135 from the first 137 to the second 141 lengths.

The arrangement in FIG. 2 has been found to be beneficial, especially in terms of being able to seal the interface between the wing and wing tip device. Nevertheless, embodiments of the present invention are thought to provide a yet further improvement, as will become apparent with reference to FIGS. 3a to 10.

Figure 3A:
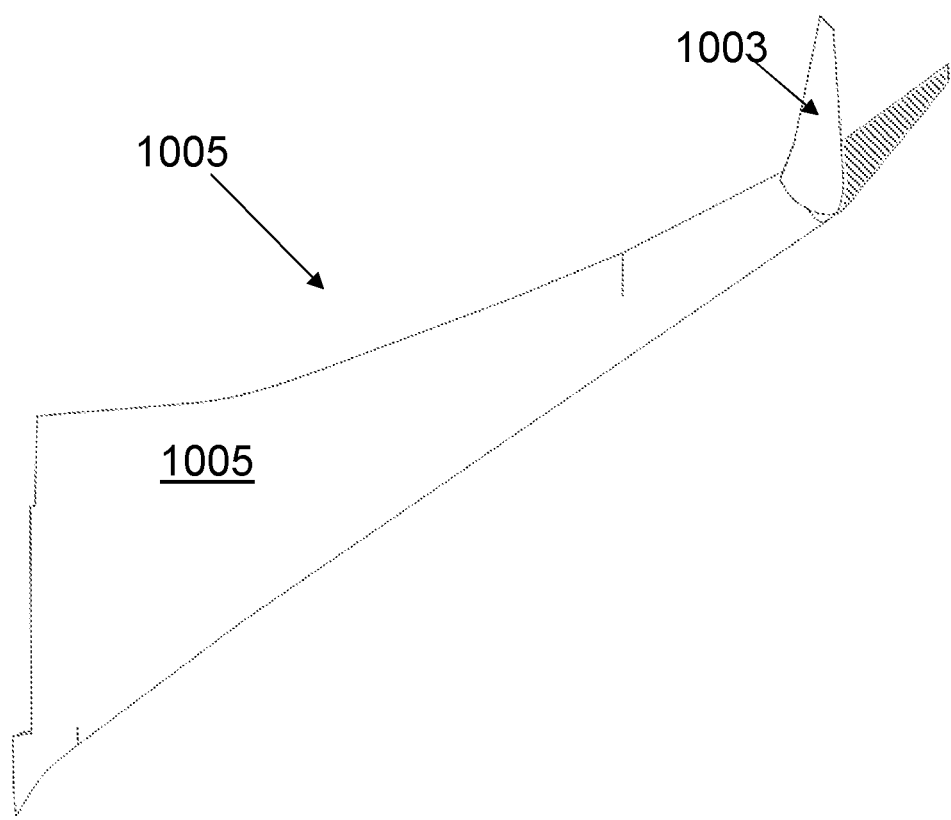
FIG. 3a shows a simplified planform view of a wing on an aircraft of a first embodiment of the invention, the wing being shown with the wing tip device in both the flight and ground configurations.
Figure 3B:
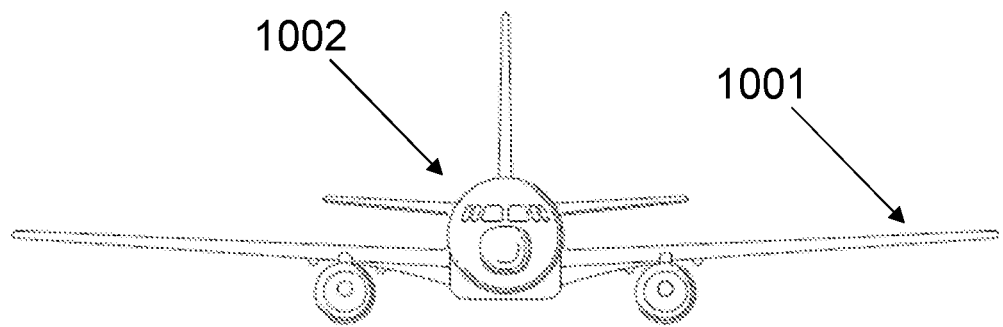

FIG. 3a shows a planform view of a wing 1001 on an aircraft 1002 of a first embodiment of the invention (the aircraft is shown in FIG. 3b). In FIG. 3a, the wing 1001 is shown with the wing tip device 1003 in both the flight and ground configurations. The flight configuration is shown in shaded form, and FIG. 3a self-evidently shows the reduction in span that occurs when the wing tip device 1003 rotates to the ground configuration. For the purposes of FIG. 3a the interfacing cut line between the fixed wing and the wing tip device is shown in simplified form—its actual shape is shown in the subsequent Figures, to which further reference is made below.

The wing tip device 1003 of the first embodiment is, in general terms, rotatable in a similar manner to that shown in FIGS. 1a-1b and in FIG. 2. In other words, the wing tip device 1003 is rotatable about an axis 1011 that is orientated normal to a notional primary oblique cut plane 1013 (see FIG. 4) separating the outer end of the fixed wing 1005 and the inner end of the wing tip device 1003. The axis 1011 is at an acute angle to all three mutually perpendicular axes X, Y and Z (i.e. chordwise, spanwise and vertical). The wing comprises a ring-shaped slew-bearing (not shown) for guiding rotation and reacting loads into the fixed wing. The notional primary cut plane 1013 passes through the middle of this slew-bearing.

Figure 5A:
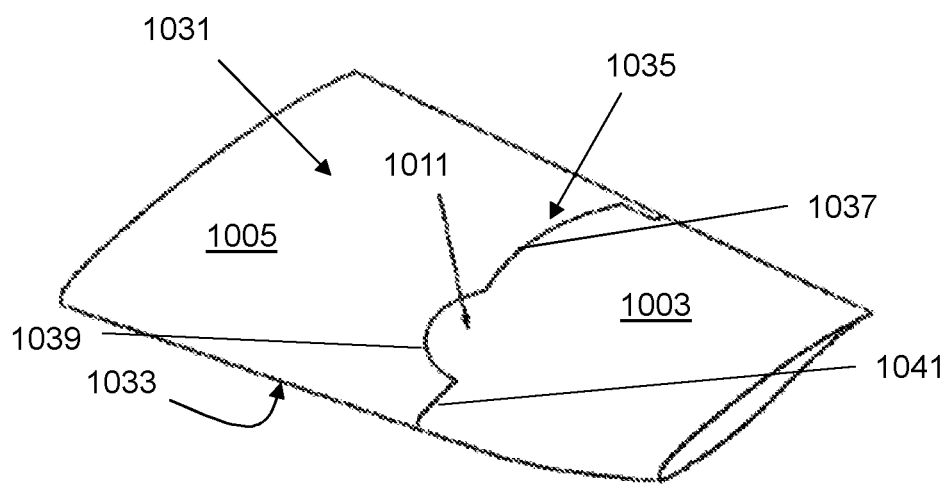
FIG. 5a is another above-frontal view of the wing in the vicinity of the fixed wing/wing tip device interface, showing the interfacing cut-lines and the cut planes.
Figure 6A:
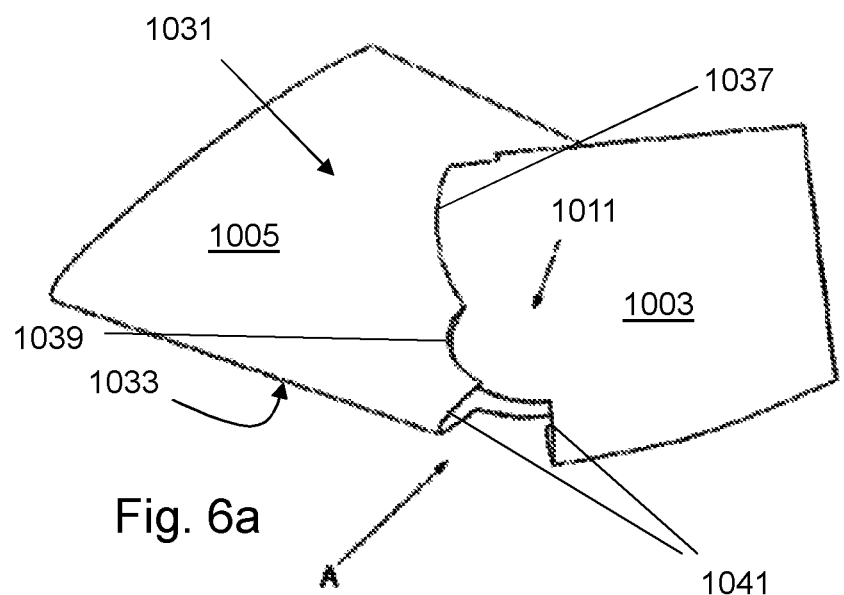
FIGS. 6a and 6b are the same as those in FIGS. 5a and 5b except that the wing tip device is in the ground configuration rather than the flight configuration.
Figure 7:
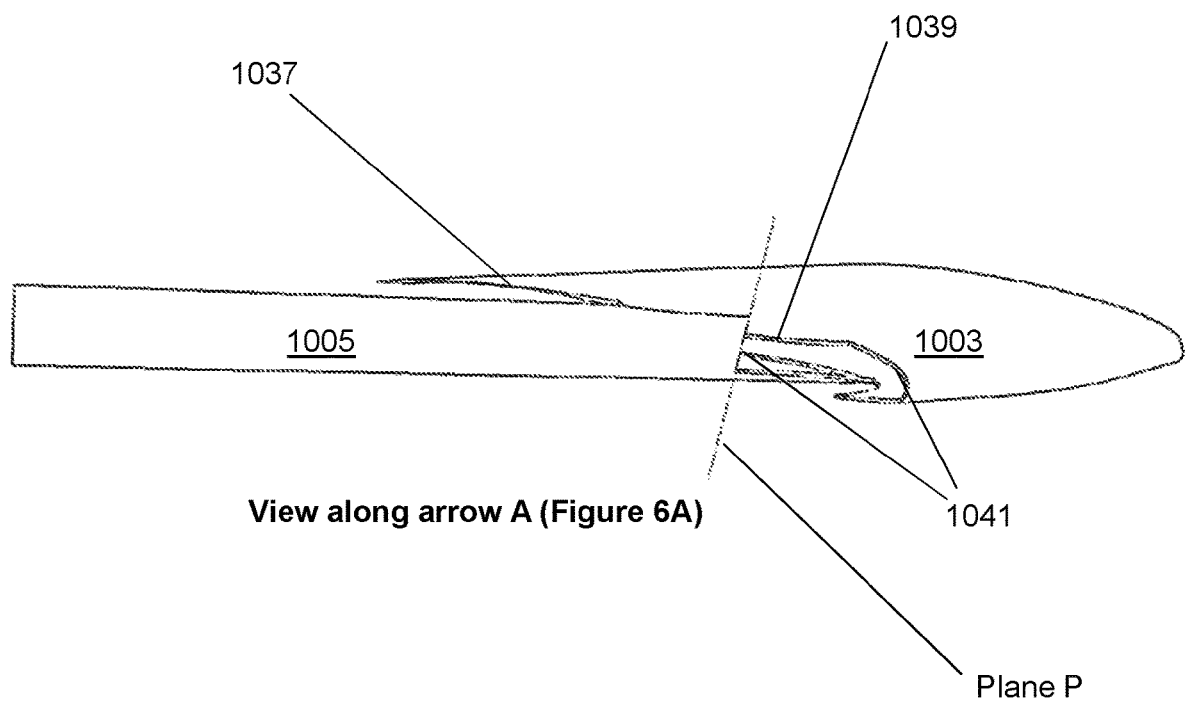

As evident in FIG. 7 and when comparing FIGS. 5a and 6a, the nature of the movement is such that as the wing tip device 1003 is rotated about the axis 1011, the upper and lower surfaces of the wing tip device that are fore of the axis 1011, move downwards; whereas the upper and lower surface that are aft of the axis move upwards.

Figure 4:
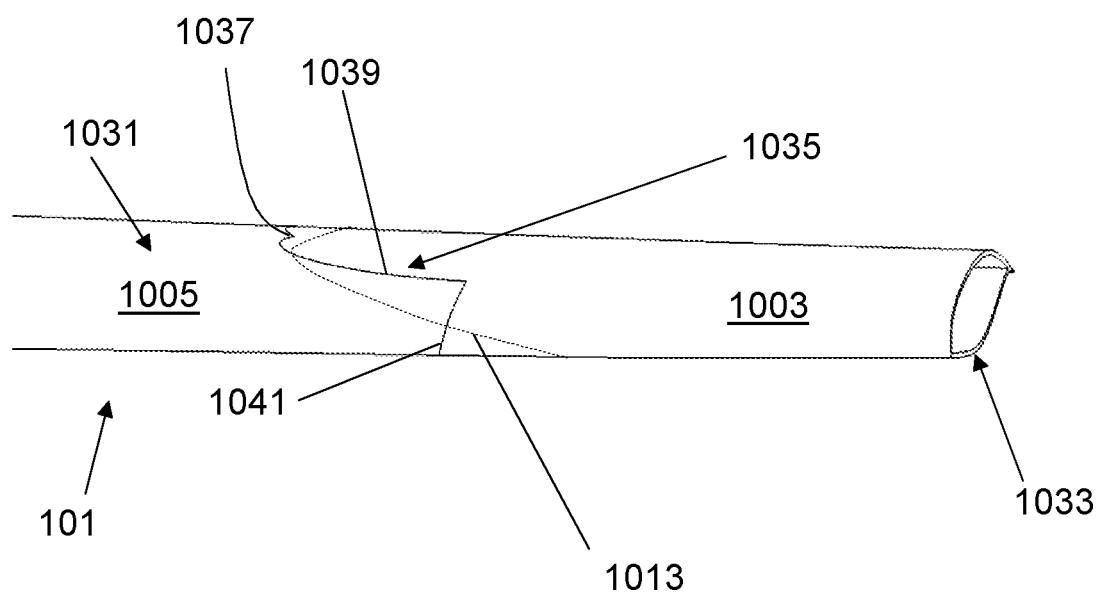
FIG. 4 is an above-frontal view of the wing in the vicinity of the fixed wing/wing tip device interface in the first embodiment of the invention, and is taken from a similar view point to that used in FIG. 2.
Figure 5B:
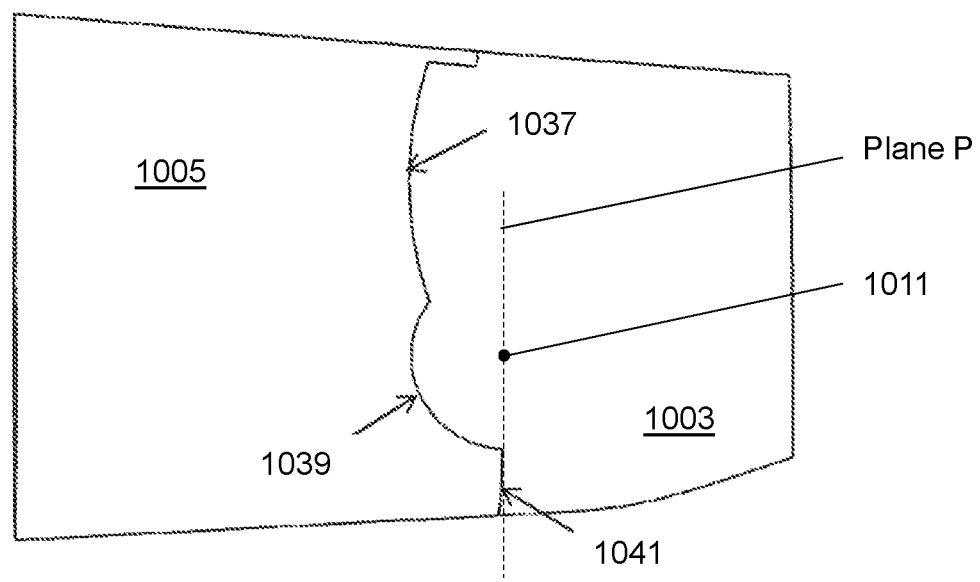

Aspects of the present invention particularly reside in the shape of the interfacing cut line between the fixed wing and the wing tip device and that will now be described in more detail with reference to FIGS. 4 to 10:

Referring first to FIGS. 4, 5a and 5b, these show views of the region around the fixed wing/wing tip device interface. The wing tip device 1003 is a planar wing tip extension (the distal end of which is not visible in these Figures). In a similar manner to FIG. 2, the wing 1001 has an upper surface 1031 and a lower surface 1033. The outer end of the fixed wing 1005 and the inner end of the wing tip device 1003 meet along the interfacing cut-line 1035 that separates the outer surfaces of the fixed wing 1005 and the wing tip device 1003. The interfacing cut line 1035 is arranged such that when the wing tip device 1003 rotates from the flight configuration to the ground configuration, specific types of relative movement occur between the outer end of the fixed wing 1005 and the inner end of the wing tip device 1003. The interfacing cut-line 1035 is formed of a series of different lengths, which are described in more detail below.

The fixed wing 1005 and the wing tip device 1003 are separated along the notional primary cut plane 1013 (to which the axis of rotation is perpendicular). The primary cut plane 1013 is indicated in FIG. 4 by the dashed-line where it intersects the wing, but does not manifest itself as a physical cut in the wing skin. Instead, and in common with the arrangement in FIG. 2, the interfacing cut line 1035 comprises a first length 1037 in the upper-aft quadrant that is offset from the primary cut plane 1013. However, in contrast to the arrangement in FIG. 2, the first length does not lie in a parallel plane; instead it is curved such that it does not lie within any single plane. Having the first length in such a curved shape has been found to be beneficial in terms of the resulting relative movement between the fixed wing and the wing tip device along the interface (when the wing tip device rotates about the axis). Furthermore, it may facilitate a relatively small transition section between the first length 1037, and a third length 1045 (on the underside of the wing—see FIG. 10), in the region of the trailing edge because the ends of those lengths can be brought relatively close together.

Figure 6B:
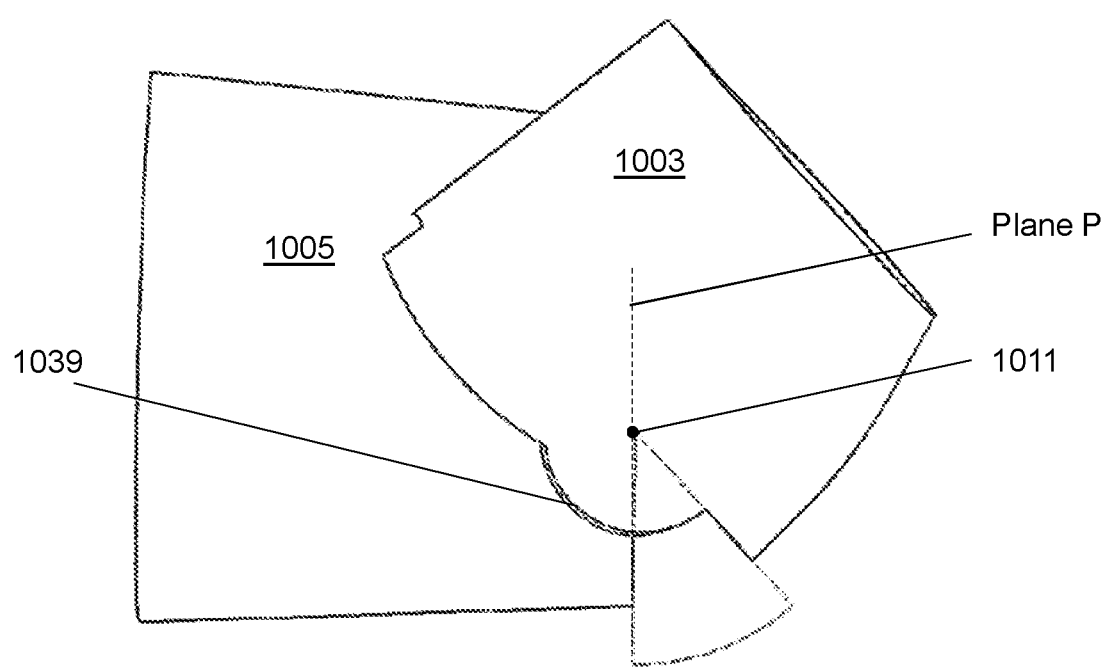

The interfacing cut line 1035 also comprises a second length 1041 located fore of the axis of rotation 1011. In contrast to the arrangement in FIG. 2, the second length is not offset outboard; instead the second length 1041 extends along the upper surface 1031 of the wing, passes through the leading edge and extends onto the lower surface 1031 of the wing. The second length 1041 lies within a plane P (schematically indicated by a dashed line in some of the Figures) containing the axis of rotation 1011, and that plane also being substantially perpendicular to the front spar of the wing (not shown). This is best illustrated in FIGS. 5b, 6b and 7.

Providing a second length 1041 that is within a plane containing the axis of rotation 1011 has been found to be especially beneficial. It has been recognised that by forming the second length in this manner, the fixed wing 1005 and wing tip device 1003 separate simultaneously along the full length of the second cut line 1041, as the wing tip device 1003 moves from the flight configuration towards the ground configuration. Furthermore, the orientation of the second length 1041 of the interfacing cut line 1035 tends to mean the fixed wing 1005 and the wing tip device 1003 separate (along the second length 1041) in a locally perpendicular direction. Thus the sealing movement tends to be a pure compression.

In other embodiments (not shown) the second length may not necessarily be in a plane containing the axis of rotation—it may instead be in a parallel plane to that. Such an arrangement does not necessarily have the simultaneously separation between the fixed wing and the wing tip device, but it does still tend to exhibit the perpendicular relative movement between the two sides of the interfacing cut line which is beneficial in terms of sealing.

Figure 8:
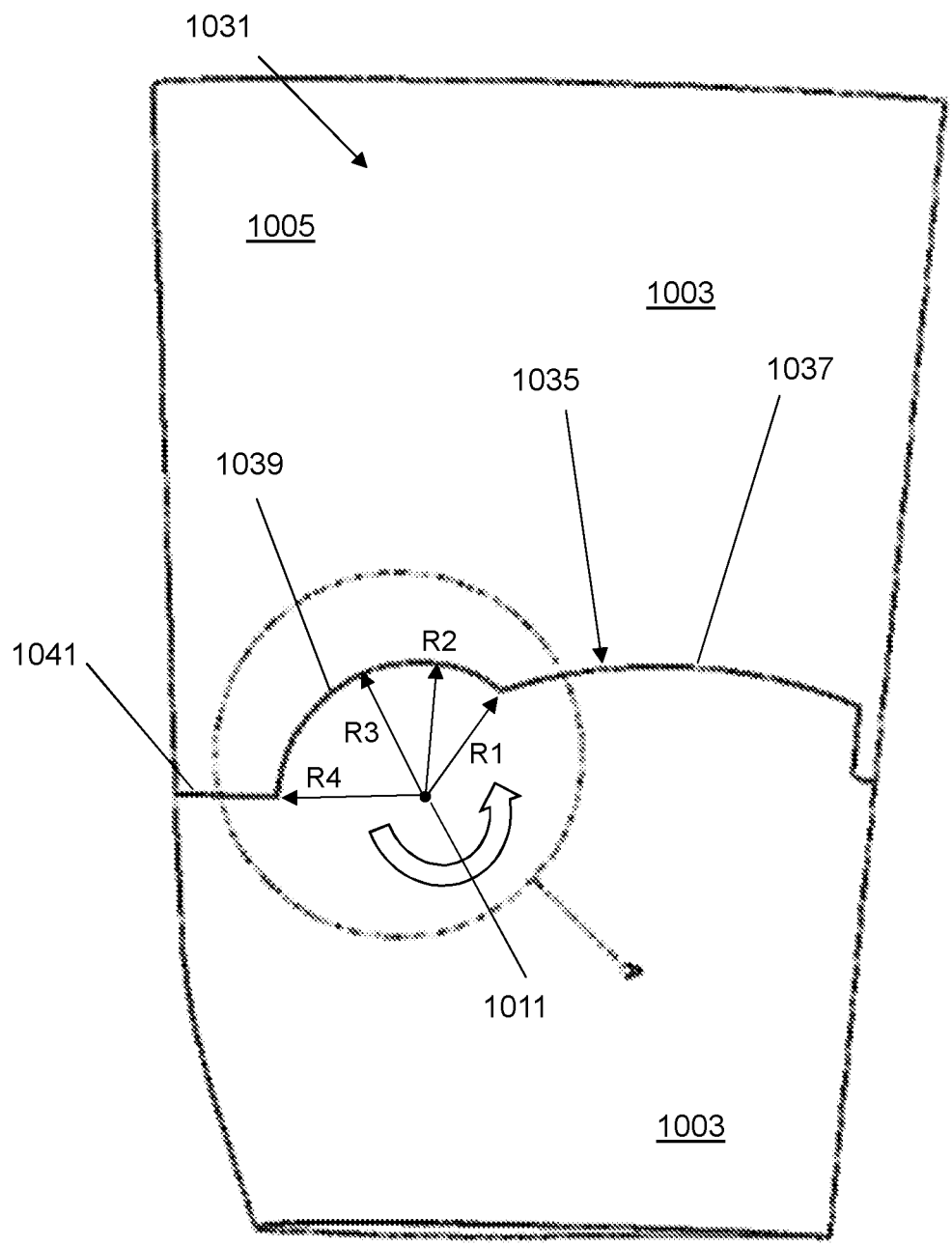
FIG. 8 is another plan view looking in a direction along the axis of rotation of the wing tip device.

A further advantageous feature of the first embodiment of the invention is the shape of the transition section 1039 between the first and second lengths 1037, 1041. In the first embodiment of the invention, the transition section 1039 is substantially in the form of a spiral as will now be explained with reference to FIGS. 8 and 9a-9c:

FIG. 8 is a view from above the wing along the axis of rotation 1011 of the wing tip device 1003, and towards the upper surface 1031 of the wing on which the interfacing cut line 1035 lies. Overlaid onto FIG. 8 are some radii R1-R4 from the axis 1011 to the interfacing cut line 1035.

The radius of the curved section 1039 continually increases as the cut line 1035 passes around the axis 1011 in the direction of rotation that moves the wing tip device from the flight configuration to the ground configuration (shown by the curved arrow in FIG. 8). Accordingly, when moving from a rearward location adjacent the first length of cut line 1037 to a forward location adjacent the second length 1141 of cut line, the radii behave such that R1<R2<R3<R4.

Figure 9A:
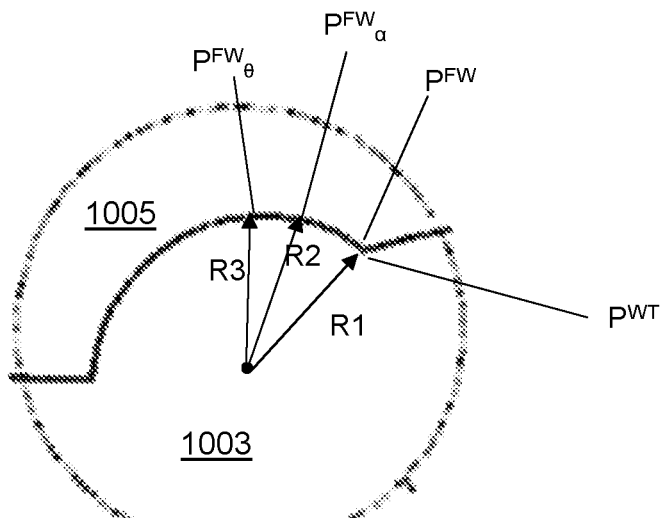
FIGS. 9a-9c show a close up view of the transition region (circled in FIG. 8) as the wing tip device moves from the flight to the ground configurations.
Figure 9B:
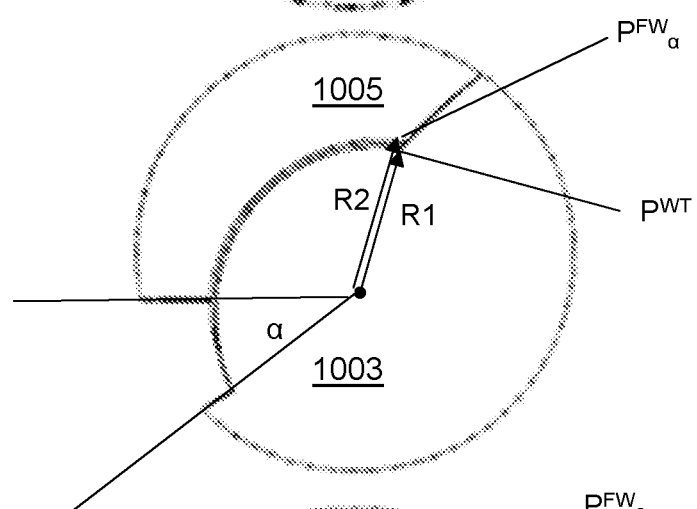
Figure 9C:
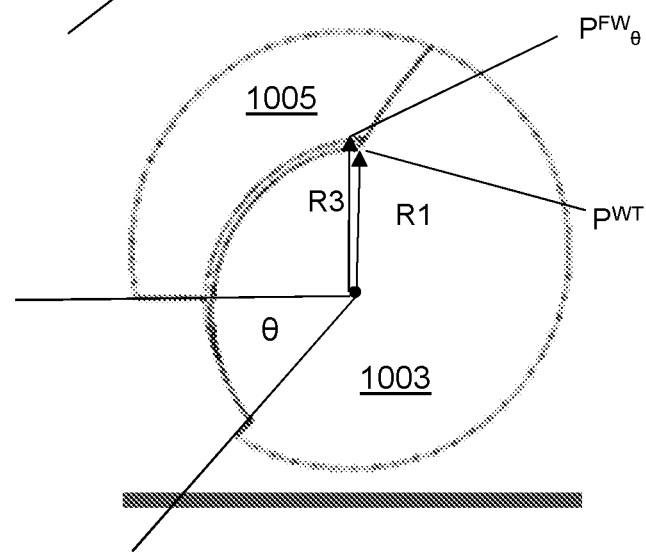

Providing an interfacing cut line having a curved section 1039 in which the radius of the curved section continuously increases around the axis of rotation 1011, has been found to be especially beneficial. In particular, since the radius of the curved section 1039 of the interfacing cut line 1035 increases, and that curved section of the interfacing cut line is centred on the rotational axis 1011 of the wing tip, it means that the structure of the wing tip device 1003 separates away from the structure of the fixed wing 1005 along this part of the interfacing cut line 1039 as the wing tip device 1003 rotates away from the flight configuration. This is best illustrated with reference to FIGS. 9a to 9c, which are close up views of the area within the dashed circle in FIG. 8 as the wing tip moves from the flight configuration (FIG. 9a) to the ground configuration (FIG. 9c).

Point $P^{wt}$ along the interfacing cut line 1035, in the curved section 1039, lies on the wing tip device 1003 side, and is at a radius R1 from the axis of rotation. When the wing tip device is in the flight configuration, a corresponding point $P^{fw}$ on the fixed wing 1005 side of the cut line 1039 will be at substantially the same radius (R1) from the axis—see FIG. 9a. As the wing tip device 1003 rotates away from the flight configuration by an angle $\alpha$, the point $P^{wt}$ on the wing tip device 1003 will rotate about the axis—see FIG. 9b. That point $P^{wt}$ is still at the radius R1 from the axis 1011 (because it lies on the wing tip device 1003), but since the radius of the cut line 1039 increases as the cut line 1039 passes around the axis, a radially outward point $P^{fw}_\alpha$ on the wing tip device (that is at the same angular location a around the axis as the new position of $P^{wt}$) will be at a greater radius (R2) from the axis due to the behaviour of the curved section 1039. The wing tip device 1003 and fixed wing 1005 will therefore necessarily move apart along the interface 1039 as the wing tip device 1003 moves away from the flight configuration (and vice versa they will move towards each other when moving into the flight configuration). Similar behaviour continues to occur as the wing tip device 1003 rotates further to angle $\theta$—see FIG. 9c. Such movement is beneficial because it tend to avoid relative sliding movement at the interface 1039.

In the first embodiment the curved section 1039 is created by creating a spline through several radii such that curved substantially follows a spiral. In other embodiments (not shown) it will be appreciated that the curve may be an exact spiral or may be other shapes that display an increasing radius around the axis of rotation.

It will be appreciated that the spiral shape of the curved section 1039 is made with reference to the view from above and along the axis of rotation (i.e. with reference to a projection of the curved section 1039 onto a plane that is perpendicular to the axis of rotation 1011). In reality, the shape of the curved section 1039 is also likely to extend out of this plane because of the curved nature of the outer surface of the wing. Nevertheless, aspects of the present invention recognise that it is the curvature around the axis of rotation of the wing tip device that is especially important in allowing the fixed wing and wingtip device to separate effectively, and it is therefore the behaviour of the curved shape from this view that is especially important.

Figure 10:
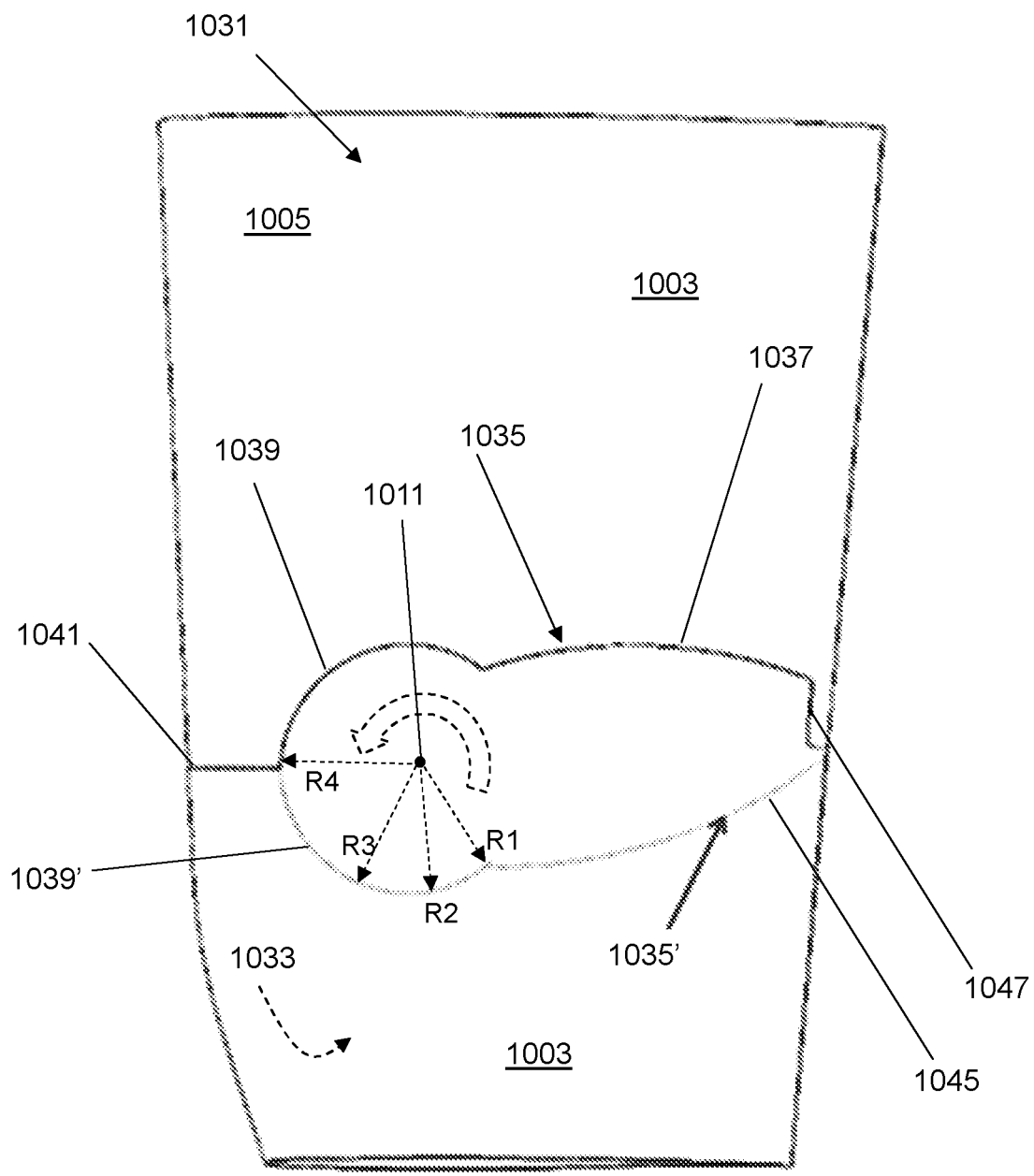
FIG. 10 is another plan view looking in a direction along the axis of rotation of the wing tip device, but also showing the interfacing cut line on the lower surface of the wing.

Reference to the interfacing cut line in FIGS. 4 to 9c has primarily been in relation to the interfacing cut line 1035 on the upper surface 1031 of the wing. Corresponding features are also present on the lower surface 1033 however, and in that respect reference is now made to FIG. 10. FIG. 10 is a view from above the axis of rotation 1011 but showing the part 1035' of the interfacing cut line 1035 on the lower surface 1033 in phantom.

The lower part 1035' of the interfacing cut line comprises a third length 1045 extending on the lower aft quadrant, and linking with the first length 1037 (on the upper surface aft quadrant) via a transition 1047 at the trailing edge. The third length 1045 is curved such that it minimises the length of the transition section 1047, yet still avoids a clash (for example with the upper surface of the wing) as the wing tip device rotates to the ground configuration.

The interfacing cut line also comprises a second curved, substantially spiral, section 1039' on the lower surface linking the third length 1045 with an end of the second length 1041 on the lower surface 1033. The second curved section 1039' also has a radius that increases as the cut line passes around the axis 1011 from the rearward location at which it joins the third length 1045 to a forward location at which it joins the second length 1041 on the lower surface (shown in dashed lines in FIG. 10, where R1<R2<R3<R4). Accordingly, as the wing tip device rotates away from the flight configuration, fixed wing and the wing tip device move apart along this interfacing cut line 1035' too.

Although radii R1 to R4 have been shown in FIG. 10, it will be appreciated that the radii need not necessarily be of the same magnitude/exact behaviour as those on the upper surface spiral section 1039.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft comprising a wing, the wing having a fixed wing with a wing tip device moveably mounted at an outer end of the fixed wing while the aircraft remains in operation, the wing tip device moveable between:
   (a) a flight configuration for use during a flight operation of the aircraft; and
   (b) a ground configuration for use while the aircraft is operational and on the ground, in which ground configuration the wing tip device is moved away from the flight configuration such that the span of the aircraft wing is reduced,
   wherein the wing tip device and the fixed wing are separated along a primary cut plane, the primary cut plane oblique to a plane of the fixed wing extending in spanwise and chordwise directions, the wing tip device rotatable between the flight and ground configurations, about an axis of rotation orientated normal to the primary cut plane, and
   wherein when the wing tip device is in the flight configuration, the outer end of the fixed wing and the inner end of the wing tip device meet along an interfacing cut line that separates an outer surface of the fixed wing and an outer surface of the wing tip device,
   the interfacing cut line comprising:
   (i) a first length, formed by a cut through the outer surface of the fixed wing, and that is offset from the primary cut plane in a first direction;
   (ii) a second length, formed by a cut through the outer surface of the fixed wing, and that extends within a plane containing the axis of rotation or within a plane parallel to the axis of rotation; and
   (iii) a transition section over which the interfacing cut line transitions from the first length to the second length, and
   wherein the second length forms a compression seal between the fixed wing and the wing tip device when the wing tip device is in the flight configuration, and the compression seal is formed as the wing tip device moves into the flight configuration from the ground configuration, and is broken as the wing tip device moves from the flight.

2. The aircraft according to claim 1, wherein the second length is formed by a cut through the outer surface that extends within the plane containing the axis of rotation.

3. The aircraft according to claim 1, wherein the plane within which the second length extends, is orientated in a line-of-flight direction.

4. The aircraft according to claim 1, wherein the fixed wing comprises a front spar and the plane within which the second length extends, is orientated perpendicular to the front spar.

5. The aircraft according to claim 1, wherein the first length is located aft of the axis of rotation, and the second length is located fore of the axis of rotation.

6. The aircraft according to claim 5, wherein the wing comprises an upper surface extending from a leading edge of the wing, over the wing, to a trailing edge of the wing, and the wing comprises a lower surface extending from the leading edge, under the wing, to the trailing edge, and
   wherein the first length is along the upper surface of the wing, and the second length extends along the upper surface of the wing, passes through the leading edge and extends onto the lower surface of the wing.

7. The aircraft according to claim 6, wherein the interfacing cut line further comprises:
   (iii) a third length, on the lower surface of the wing that is formed by a cut through the outer surface of the fixed wing that is offset from the primary cut plane in a second direction, opposite to the first direction; and
   (iv) a further transition section over which the interfacing cut line transitions from the third length to the second length on the lower surface.

8. The aircraft according to claim 7, wherein the interfacing cut line comprises a further transition section between the first and third lengths, such that the interfacing cut line is made up of the first to third lengths, each of the first to the third lengths transitioning into an adjacent one of the first to third lengths by a respective transition section.

9. The aircraft according to claim 7, wherein the third length is located aft of the axis of rotation.

10. The aircraft according to claim 1, wherein the transition section is a curved section centered on the axis of rotation, the radius of the curved section constantly increasing as the cut line passes around the axis of rotation.

11. The aircraft according to claim 1, wherein the first length is curved.

12. An aircraft wing including a fixed wing with a wing tip device moveably mounted at an outer end of the fixed wing, the wing tip device moveable between:
   (a) a flight configuration for use during flight operations of an aircraft having the aircraft wing; and
   (b) a ground configuration used by the aircraft while the aircraft is operational on the ground, for use during ground-based operations, in which ground configuration the wing tip device is moved away from the flight configuration such that the span of the aircraft wing is reduced,
   wherein the wing tip device and the fixed wing are separated along a primary cut plane, the primary cut plane oblique to a plane of the fixed wing extending in spanwise and chordwise directions, and the wing tip device rotatable between the flight and ground configurations, about an axis of rotation orientated normal to the primary cut plane, and
   wherein when the wing tip device is in the flight configuration, an outer end of the fixed wing and an inner end of the wing tip device meet along an interfacing cut line that separates an outer surface of the fixed wing and an outer surface of the wing tip device, the interfacing cut line comprising:
   (i) a first length, formed by a cut through the outer surface of the fixed wing, that is offset from the primary cut plane in a first direction;
   (ii) a second length, formed by a cut through the outer surface of the fixed wing, that extends within a plane containing the axis of rotation or within a plane parallel to the plane containing the axis of rotation; and
   (iii) a transition section in which the interfacing cut line transitions from the first length to the second length,
   wherein a sealing assembly at the second length forms a compression seal between the fixed wing and the wing tip device when the wing tip device is in the flight configuration, and the compression seal is formed as the wing tip device moves into the flight configuration from the ground configuration, and is broken as the wing tip device moves from the flight configuration to the ground configuration.

13. A fixed wing of an aircraft configured to receive a wing tip device, wherein the wing tip device is separated from the fixed wing along a primary cut plane, the primary cut plane oblique to a plane of the fixed wing extending in spanwise and chordwise directions, such that the wing tip device rotatable between a flight configuration and a ground configuration about an axis of rotation orientated normal to the primary cut plane, wherein the aircraft is operational in both the flight and ground configurations, and wherein an outer end of the fixed wing is shaped to meet an inner end of the wing tip device along an interfacing cut line that separates an outer surface of the fixed wing and an outer surface of the wing tip device, the interfacing cut line comprising:
(i) a first length, formed by a cut through the outer surface of the fixed wing and that is offset from the primary cut plane in a first direction;
(ii) a second length, formed by a cut through the outer surface of the fixed wing and that extends within a plane containing the axis of rotation or within a plane parallel to the plane containing the axis of rotation; and
(iii) a transition section in which the interfacing cut line transitions from a first length to a second length,
wherein the second length forms a compression seal between the fixed wing and the wing tip device when the wing tip device is in the flight configuration, and the compression seal is formed as the wing tip device moves into the flight configuration from the ground configuration, and is broken as the wing tip device moves from the flight configuration to the ground configuration.

14. A wing tip device configured received on a fixed wing of an aircraft, wherein the wing tip device is separated along a primary cut plane from the fixed wing, the primary cut plane oblique to a plane of the fixed wing extending in spanwise and chordwise directions, such that the wing tip device is rotatable between a flight configuration and a ground configuration about an axis of rotation orientated normal to the primary cut plane, wherein the aircraft is operational in both the flight and ground configurations, and wherein an inner end of the wing tip device is shaped to meet an outer end of the fixed wing along an interfacing cut line that separates an outer surface of the fixed wing and the wing tip device, the interfacing cut line comprising:
(i) a first length, formed by a cut through the outer surface of the wing tip device and that is offset from the primary cut plane in a first direction;
(ii) a second length formed by a cut through a leading edge of the outer surface of the wing tip device and the second length is within a plane containing the axis of rotation or within a plane parallel to the plane containing the axis of rotation; and
(iii) a transition section in which the interfacing cut line transitions from a first length to a second length,
wherein the second length forms a compression seal between the fixed wing and the wing tip device when the wing tip device is in the flight configuration, and the compression seal is formed as the wing tip device moves into the flight configuration from the ground configuration, and is broken as the wing tip device moves from the flight configuration to the ground configuration.

15. A method of designing an interface between the outer end of a fixed wing and the inner end of a wing tip device for an aircraft, the wing tip device moveable between:
(a) a flight configuration for use during flight operations of the aircraft; and
(b) a ground configuration for use while the aircraft is operational on the ground, in which ground configuration the wing tip device is moved away from the flight configuration such that the span of the aircraft wing is reduced,
wherein the method comprises the steps of:
separating the wing tip device and the fixed wing along a primary cut plane, the primary cut plane oblique to a plane of the fixed wing extending in spanwise and chordwise directions, and the wing tip device rotatable between the flight and ground configurations, about an axis of rotation orientated normal to the primary cut plane,
defining an interfacing cut line that separates an outer surface of the fixed wing and an outer surface of the wing tip device, by defining
(i) a first length, formed by cut through the outer surface of the fixed wing that is offset from the primary cut plane in a first direction;
(ii) a second length, formed by a cut through the outer surface of the fixed wing within a plane containing the axis of rotation, or within a plane parallel to the plane containing the axis of rotation; and
(iii) a transition section in which the interfacing cut line transitions from the first length to the second length,
wherein the second length forms a compression seal between the fixed wing and the wing tip device when the wing tip device is in the flight configuration, and the compression seal is formed as the wing tip device moves into the flight configuration from the ground configuration, and is broken as the wing tip device moves from the flight configuration to the ground configuration.

16. The method according to claim 15 in which the wing tip device is then manufactured to the design.

17. An aircraft comprising a wing, the wing having a fixed wing with a wing tip device moveably mounted at an outer end of the fixed wing, the wing tip device moveable between:
(a) a flight configuration for use during flight operations of the aircraft; and
(b) a ground configuration for use while the aircraft is operational on the ground, in which ground configuration the wing tip device is moved away from the flight configuration such that a span of the aircraft wing is reduced from the flight configuration,
wherein the wing tip device is rotatable between the flight and ground configurations, about an axis of rotation oblique to a plane of the fixed wing extending in spanwise and chordwise directions, such that the wing tip device rotates upwards and rearwards when moving from the flight to the ground configurations, and
wherein when the wing tip device is in the flight configuration, an outer end of the fixed wing and an inner end of the wing tip device meet along an interfacing cut line that separates an outer surface of the fixed wing and an outer surface of the wing tip device,
wherein the interfacing cut line comprising a leading edge section passing over an upper surface of the wing, through a leading edge of the wing and onto a lower surface of the wing, the leading edge section of the cut line formed by a cut that extends within a plane containing the axis of rotation, wherein the interfacing cut line comprising an upper surface section located on the upper surface and extending through the axis of rotation and being offset inboard from the plane containing the axis of rotation;
wherein the interfacing cut line comprising a lower surface section located on the lower surface to the rear of the axis of rotation and offset outboard from the plane containing the axis of rotation, wherein the second length forms a compression seal between the fixed wing and the wing tip device when the wing tip device is in the flight configuration, and the compression seal is formed as the wing tip device moves into the flight configuration from the ground configuration, and is broken as the wing tip device moves from the flight configuration to the ground configuration.

18. The aircraft according to claim 17, wherein the leading edge section of the interfacing cut line adjoins upper and lower curved sections of the interfacing cut line, wherein the upper curved section is in the upper surface section and the lower curved section is in the lower surface section.

* * * * *